United States Patent
Kalb et al.

(10) Patent No.: US 11,913,908 B2
(45) Date of Patent: Feb. 27, 2024

(54) REAL-TIME MONITORING OF MASS LOSS FROM EROSIVE FLOW

(71) Applicant: Dril-Quip, Inc., Houston, TX (US)

(72) Inventors: Frank D. Kalb, Cypress, TX (US); Alexander Anthony Bradley, Houston, TX (US)

(73) Assignee: Dril-Quip, Inc., Houston, TX (US)

( * ) Notice: Subject to any disclaimer, the term of this patent is extended or adjusted under 35 U.S.C. 154(b) by 676 days.

(21) Appl. No.: 17/058,437

(22) PCT Filed: May 17, 2019

(86) PCT No.: PCT/US2019/032775
§ 371 (c)(1),
(2) Date: Nov. 24, 2020

(87) PCT Pub. No.: WO2019/231710
PCT Pub. Date: Dec. 5, 2019

(65) Prior Publication Data
US 2021/0215643 A1    Jul. 15, 2021

Related U.S. Application Data

(60) Provisional application No. 62/677,942, filed on May 30, 2018.

(51) Int. Cl.
    *G01N 29/07*    (2006.01)
    *E21B 33/05*    (2006.01)
    (Continued)

(52) U.S. Cl.
    CPC ............. *G01N 29/07* (2013.01); *E21B 33/05* (2013.01); *E21B 47/00* (2013.01); *G01N 29/223* (2013.01);
    (Continued)

(58) Field of Classification Search
    CPC ...... G01N 29/07; G01N 29/223; G01N 29/28; G01N 2291/0258; G01N 2291/02854; E21B 33/05; E21B 47/00
    See application file for complete search history.

(56) References Cited

U.S. PATENT DOCUMENTS

| 4,437,332 A * | 3/1984 | Pittaro | G01N 29/07 |
| | | | 73/644 |
| 10,345,221 B1 * | 7/2019 | Silverman | G01N 29/28 |
| (Continued) | | | |

FOREIGN PATENT DOCUMENTS

| EP | 2661618 A1 * | 11/2013 | ............ G01B 17/02 |
| EP | 2661618 B1 | 10/2014 | |
| WO | 2014/193808 A1 | 12/2014 | |

OTHER PUBLICATIONS

International Search Report and Written Opinion issued in related PCT Application No. PCT/US2019/032775 dated Sep. 10, 2019, 13 pages.

(Continued)

*Primary Examiner* — Natalie Huls
*Assistant Examiner* — Sharad Timilsina
(74) *Attorney, Agent, or Firm* — Baker Botts L.L.P.

(57) ABSTRACT

Systems and methods for continuously monitoring mass loss through flow erosion of a well equipment component are provided. The disclosed system includes a wear transducer mounted to the equipment component proximate a portion of the equipment component exposed to erosive fluid flow. The wear transducer includes a metal coupon including an elongated end that extends into a flowpath of the equipment component such that the elongated end is exposed to the erosive fluid flow. The wear transducer also includes an ultrasonic sensor disposed within the metal coupon. The ultrasonic sensor transmits ultrasonic signals through the metal coupon toward the elongated end and receives ultrasonic signal reflections reflected back from the elongated end.

17 Claims, 4 Drawing Sheets

(51) Int. Cl.
*E21B 47/00* (2012.01)
*G01N 29/28* (2006.01)
*G01N 29/22* (2006.01)

(52) U.S. Cl.
CPC ..... *G01N 29/28* (2013.01); *G01N 2291/0258* (2013.01); *G01N 2291/02854* (2013.01)

(56) References Cited

U.S. PATENT DOCUMENTS

| | | | |
|---|---|---|---|
| 2005/0248334 A1 | 11/2005 | Dagenais et al. | |
| 2010/0326654 A1* | 12/2010 | Hemblade | E21B 43/04 166/250.01 |
| 2015/0240627 A1 | 8/2015 | Gao et al. | |
| 2016/0109413 A1* | 4/2016 | Bonadies, Jr. | G01N 17/006 73/598 |

OTHER PUBLICATIONS

Examination Report issued in related Great Britain Application No. GB2018160.8 dated Jan. 19, 2022, 2 pages.
International Preliminary Report on Patentability issued in related PCT Application No. PCT/US2019/032775 dated Dec. 10, 2020, 10 pages.
Search Report issued in related Norwegian Patent Application No. 20201297 dated May 20, 2021, 2 pages.

* cited by examiner

REAL-TIME MONITORING OF MASS LOSS FROM EROSIVE FLOW

CROSS-REFERENCE TO RELATED APPLICATION

The present application is a U.S. National Stage Application of International Application No. PCT/US2019/032775 filed May 17, 2019, which claims priority to and the benefit of U.S. Provisional Application Serial No. 62/677,942 filed on May 30, 2018, both of which are incorporated herein by reference in their entirety for all purposes.

TECHNICAL FIELD

The present disclosure relates generally to monitoring erosive wear on equipment exposed to multiphase flow and, more particularly, to a system and method for monitoring erosive wear on equipment in real time to provide timely maintenance.

BACKGROUND

Certain pieces of oil field equipment, such as cementing heads, are subjected to turbulent, multiphase fluid flow during well operations. This turbulent, multiphase flow can cause erosive wear on metal parts of the oil field equipment. As high flow rates increase, restrictive cross sections of the equipment can increase the fluid velocities into thresholds that become cutting. This can lead to undesirable loss of mass in critical component geometries of the well equipment.

To prevent the susceptible equipment from operating inefficiently or breaking down, it is desirable to perform preventive maintenance on the oil field equipment prior to the equipment losing a significant amount of mass due to erosive wear. In conventional methods, this involves testing equipment before it is used to estimate when preventive maintenance will be needed. In the development of equipment for turbulent, multiphase flow environments, experimental methods have been used to estimate when preventive maintenance is needed on equipment components. These experimental methods empirically measure wear rates that are associated with various fluid densities and flow rates to predict a duty cycle for operational equipment before preventive maintenance is required. In addition to following the guidelines from such empirical tests, the oil field equipment is often taken out of service for a physical inspection of worn components to determine if there is any operable life remaining in the components. This process is time consuming as the equipment must be broken down, cleaned out, and then inspected for wear.

Unfortunately, the above efforts to determine when preventive maintenance is needed are detrimental to the real duty cycle of the equipment, as they can lead to a product being taken out of service prematurely when there is ample life left in the system. It is now recognized that a need exists for more accurate determinations of when maintenance is needed on oil field equipment subject to turbulent, multiphase flow.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
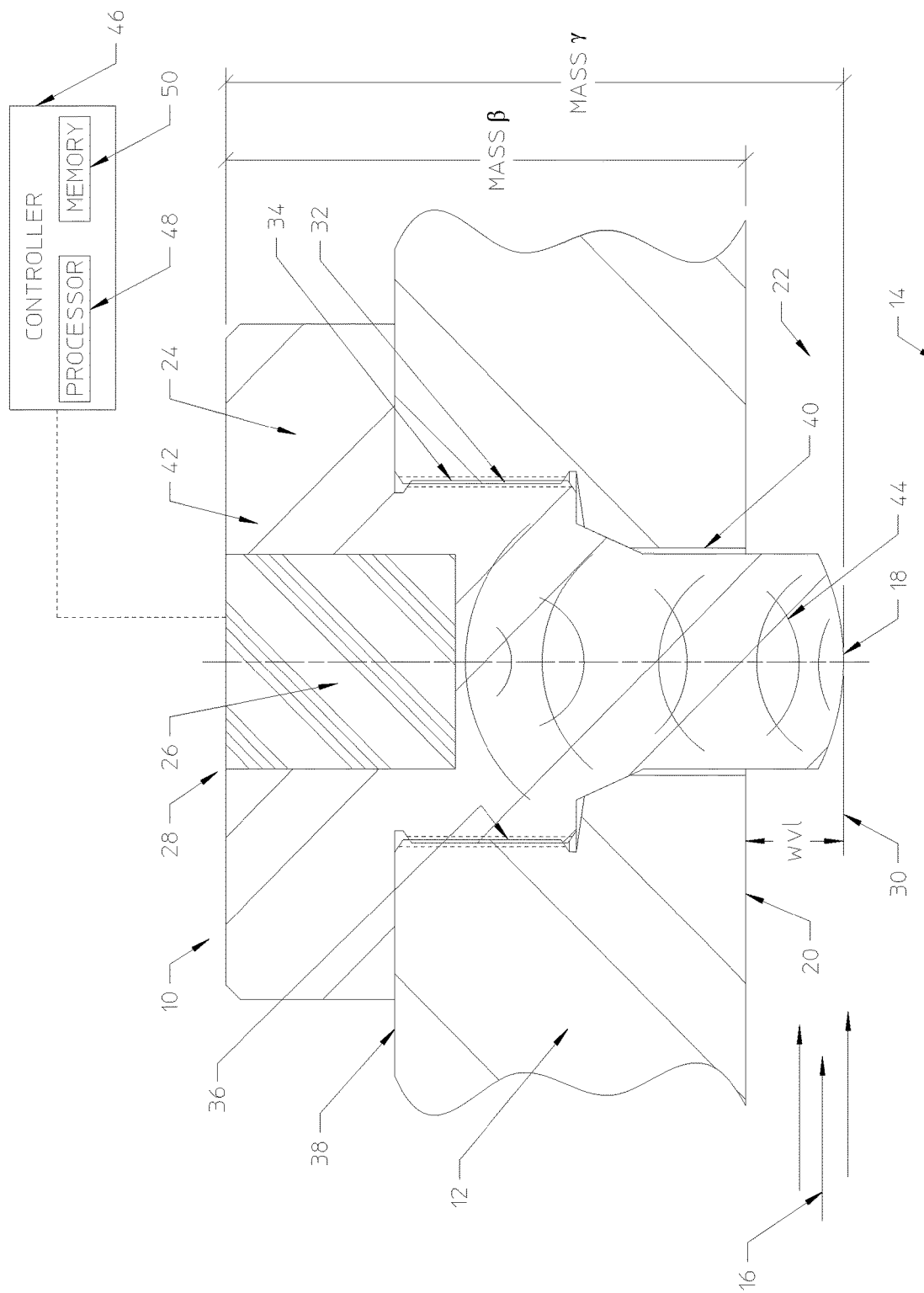
FIG. 1 is a cross-sectional view of a wear transducer designed to detect metal erosion in turbulent, multiphase flow environments, in accordance with an embodiment of the present disclosure.

Illustrative embodiments of the present disclosure are described in detail herein. In the interest of clarity, not all features of an actual implementation are described in this specification. It will of course be appreciated that in the development of any such actual embodiment, numerous implementation specific decisions must be made to achieve developers' specific goals, such as compliance with system related and business related constraints, which will vary from one implementation to another. Moreover, it will be appreciated that such a development effort might be complex and time consuming, but would nevertheless be a routine undertaking for those of ordinary skill in the art having the benefit of the present disclosure. Furthermore, in no way should the following examples be read to limit, or define, the scope of the disclosure.

Certain embodiments according to the present disclosure may be directed to a device and method for real-time monitoring of erosion of metal components operating in turbulent, multiphase flow environments. These metal components may include oil field equipment that is known to be subjected to turbulent, multiphase flow, such as cementing heads. Although the real-time monitoring system is described below with reference to use in cementing heads, the system may similarly be applied to and used within any other types of well equipment that will be subjected to high velocity, turbulent, and/or multiphase flow that can lead to metal erosion.

Turbulent, multiphase flow can cause erosive wear on metal parts of oil field equipment, leading to undesirable loss of mass in critical component geometries of the equipment. Conventional methods for preventing such loss of mass in the equipment involve providing preventive maintenance before such mass loss occurs. Typically, this involves stopping operations at specific time intervals, removing and inspecting the wear on well equipment, and providing maintenance as needed at these times. The time intervals are determined based on empirical tests that have been performed on the relevant equipment material. Unfortunately, this one size fits all approach to determining when to perform preventive maintenance can lead to equipment being taken out of service when there is still ample operational life left in the component.

The disclosed system and method address the downsides associated with currently employed methods. Specifically, the disclosed system and method improves on the diagnostic capabilities of existing methods by using real-time measurements of critical wall thickness and cross sections. One or more critical areas of the well equipment are continuously monitored for mass loss through flow erosion to the point where the mass loss is critical or below an acceptable threshold requiring maintenance to repair or replace the worn components. This real-time monitoring may maximize the service life that can be realized in well equipment before taking the equipment components out of service, thereby minimizing any unnecessary servicing and downtime for the well equipment.

Turning now to the drawings, FIG. 1 illustrates a wear transducer 10 in accordance with an embodiment of the present disclosure. The wear transducer 10 is coupled to a metal equipment component 12 that will be subjected to multiphase fluid flow during operation within a well system. The equipment component 12 may be a tubular equipment component, with only a portion of the tubular equipment component on one side of the axis 14 being illustrated in FIG. 1. It should be noted that the equipment component 12 continues around to the other side of the axis 14 as well. The equipment component 12 may include a cementing head in some embodiments, although the wear transducer 10 is not limited to use within the context of cementing heads. During operation of the well equipment, the equipment component 12 may be exposed to an erosive fluid flow 16. This erosive fluid flow 16 may be a multiphase fluid flow (e.g., fluid that is traveling through the component in both liquid and solid, or even gaseous phases). The erosive fluid flow 16 to which the equipment component 12 is exposed may be single phase or multiphase and traveling in flow regimes that create critical velocities that promote metal wear or cutting. The fluid flow 16 may include such fluid as cements, weighted drilling fluids, weighted displacement fluids, brines, completion fluids, and pressure control fluids.

As illustrated, the wear transducer 10 may be shaped such that the transducer 10 extends entirely through a body or wall of the equipment component 12 being monitored. An elongated end 18 of the wear transducer 10 extends through an inner wall 20 and into a bore 22 of the equipment component 12. The erosive fluid flow 16 travels through this bore 22 during operation of the equipment. Thus, the end 18 of the wear transducer 10 extending through the inner wall 20 is exposed to the same erosive fluid flow 16 as the rest of the equipment component 12. This end 18 of the wear transducer 10 is a sacrificial coupon that will lose mass over the course of operation of the system, and the wear transducer 10 is configured to detect and continually monitor the material thickness and thus reduction of mass of this sacrificial coupon.

As wear is occurring within the sacrificial coupon end 18 of the wear transducer 10, it is assumed that the equipment component 12 is experiencing a similar amount of wear in that region of erosive fluid flow 16. Therefore, the monitoring of mass loss due to fluid flow eroding the end 18 of the wear transducer 10 gives a direct indication of when timely preventive maintenance is needed on the equipment component 12. The disclosed wear transducer 10 is therefore able to provide active feedback on the system for determining when maintenance is required. This is preferable to existing techniques, which generally involve only passive monitoring of the system through inspections performed at regular intervals. Since the disclosed system determines maintenance requirements based on actual wear that is taking place within the equipment component 12 at that time, it allows the equipment component 12 to remain on line for longer than would be possible if maintenance was performed at regular intervals determined based on prior test results.

The wear transducer 10 generally includes a metal coupon portion 24, which includes the end 18 extending into the equipment flowpath. The wear transducer 10 also includes a "potted" ultrasonic sensor 26 that is disposed in an opposite end 28 of the metal coupon portion 24. The metal coupon portion 24 of the wear transducer 10 has a predetermined mass, volume, density, and length at the time it is first installed into the equipment component 12. The wear transducer 10 is mounted such that the end 18 of the metal coupon portion 24 of the wear transducer 10 extends through the inner wall 20 of the equipment component 12 and is directly exposed to the erosive fluid flow 16 in a high velocity region of the well equipment. The exposed portion 18 of the metal coupon 24 of the wear transducer 10 has a known length 30 and a known volume at the time it is first installed.

The wear transducer 10 may be mounted on and coupled to the equipment component 12 via a connecting mechanism 32. The connecting mechanism 32 may be any desirable type of mechanism that connects the wear transducer 10 to the equipment component 12. For example, the connecting mechanism 32 may include a threaded connection (as illustrated) between a slightly enlarged middle portion 34 of the metal coupon 24 and a threaded bore 36 formed in the equipment component 12 proximate an external wall 38 of the equipment component 12. In other embodiments, the connecting mechanism 32 may be an interference fit between the middle portion 34 of the metal coupon 24 and the bore 36 in the equipment component 12. The equipment component 12 may include a smaller diameter bore 40 that continues from the bore 36 to the inner wall 20 of the equipment component, thereby allowing the end 18 of the wear transducer 10 to extend therethrough. The metal coupon 24 of the wear transducer 10 may also include a flange portion 42 that engages with the outer wall 38 of the equipment component 12 when the metal coupon 24 is effectively coupled to the equipment component 12 (i.e., when the connection mechanism 32 is fully made up).

Although not shown, in other embodiments the connection mechanism 32 may instead be a bolted connection directly between the flange portion 42 of the metal coupon 24 and the equipment component 12. That is, the bolts may extend through the flange portion 42 and the outer wall 38 of the equipment component 12 to effectively mount the wear transducer 10 to the equipment component 12.

In operation, the wear transducer 10 is used to detect changes in the length of the metal coupon 24 due to wear on the end 18 of the coupon 24 that is exposed to the erosive fluid flow 16. The ultrasonic sensor 26 of the wear transducer 10 operates in reflection mode, first transmitting an ultrasonic signal at an appropriate incidence angle toward the end 18 of the coupon 24 and then receiving an ultrasonic wave reflection 44 back from the end 18 of the coupon 24. The ultrasonic detection from sensor 26 will work in conjunction with the metal coupon 24 of the wear transducer 10 to measure several aspects of erosive wear.

Figure 2:
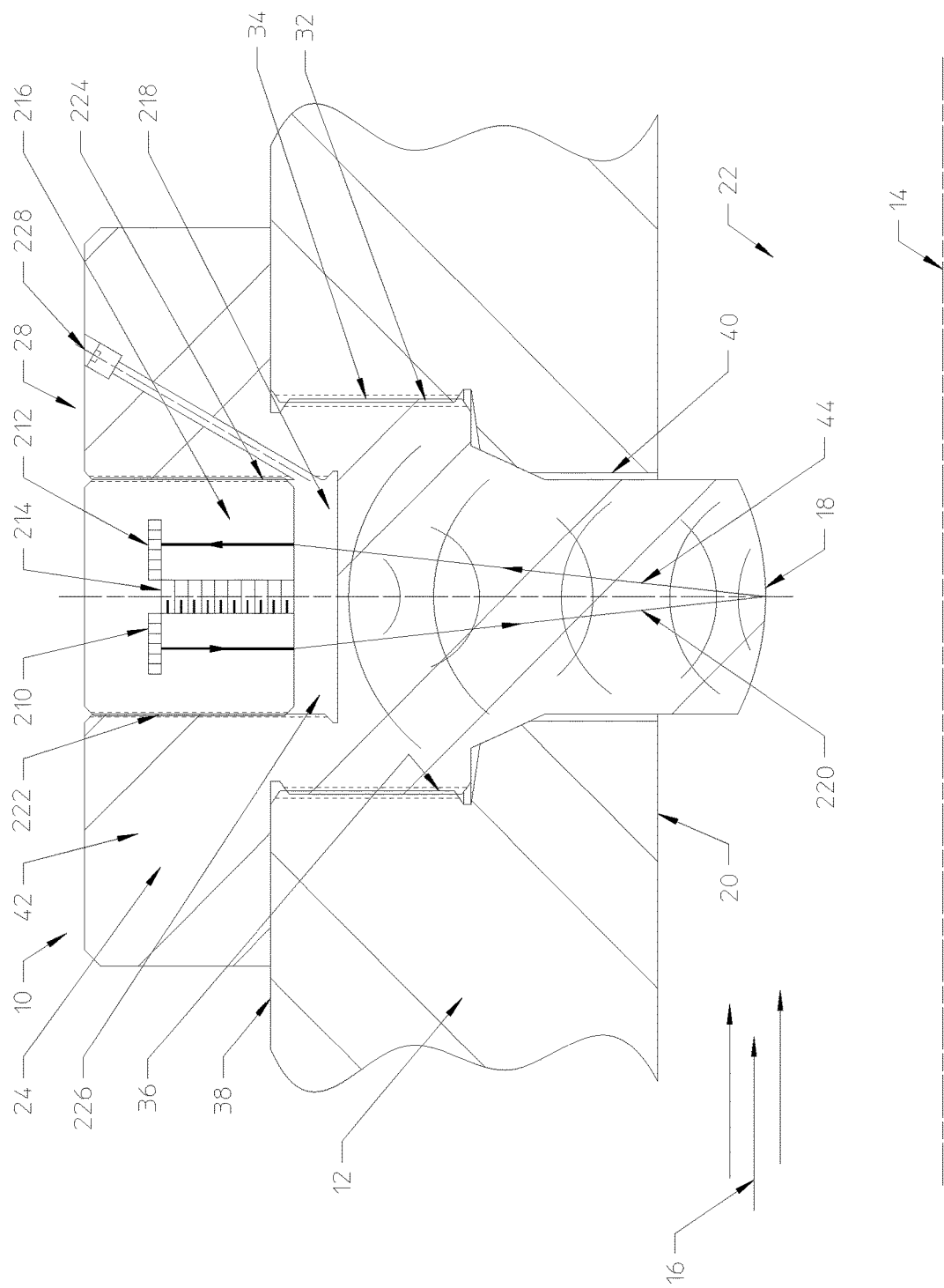
FIG. 2 is a more detailed cross-sectional view of a wear transducer designed to detect metal erosion in turbulent, multiphase flow environments, in accordance with an embodiment of the present disclosure.

FIG. 2 provides a more detailed illustration of an embodiment of the disclosed wear transducer 10. As illustrated, the ultrasonic sensor 26 located within the transducer 10 generally includes a transmitting crystal 210, a receiving crystal 212, an acoustic barrier 214, a case 216, and a layer of acoustic gel 218. The transmitting crystal 210 is used to transmit ultrasonic signals 220 through the metal coupon 24 in the direction of the end 18 of the metal coupon 24. The receiving crystal 212 is used to receive the ultrasonic signals 44 that are reflected back from the end 18 of the metal coupon 24. The acoustic barrier 214 is located between the transmitting crystal 210 and the receiving crystal 212. The acoustic barrier 214 is made from a material that blocks acoustic waves so that the acoustic signal output from the transmitting crystal 210 does not interfere with another acoustic reflection being picked up by the receiving crystal 212, or vice versa.

The case 216 of the ultrasonic sensor 26 houses the transmitting/receiving crystals 210/212 and the acoustic barrier 214. The case 216 may be disposed within and connected to the metal coupon 24 via a threaded connection 222, or an interference fit. A bore 224 formed through the metal coupon 24 is designed to receive the case 216 holding the ultrasonic components. The bore 224 may be threaded, and in some instances the case 216 may be connected to the interior walls of the bore via a sealed connection that prevents liquid ingress or egress. The length of the bore 224 in a direction toward axis 14 may be longer than a corresponding length of the case 216 in the direction toward axis 14, thus forming a space 226 between the end of the case 216 and an edge of the metal coupon 24. The layer of acoustic gel 218 fills this space 226. The layer of acoustic gel 218 may be input to this space through an inlet 228 extending into the metal coupon 24, after which the inlet 228 is plugged. The layer of acoustic gel 218 directs the acoustic signals that are being output from and reflected back into the case 216.

In operation, the transmitting crystal 210 transmits the ultrasonic signal 220 through the metal coupon 24 to measure the time for sound to travel through the metal coupon 24 and to reflect back to the receiving crystal 212. The ultrasonic wave returns to the receiving crystal 212 after reflection on the worn end 18 of the metal coupon 24. The wear transducer 10 measures the time it takes for sound to traverse the sacrificial wear coupon 24 in the form of ultrasonic waves 220 and their reflections 44. As erosion from the multiphase flow 16 occurs, the time required to traverse and reflect back becomes shorter and shorter as the erosion wears away the end 18 of the metal coupon 24 exposed to the flow 16. This is indicative of erosion wear on the surrounding equipment component 12.

Turning back to FIG. 1, the ultrasonic sensor 26 may be communicatively coupled to a controller 46 via a wired or wireless connection. The controller 46 may be located at a surface of the well where the equipment component 12 is positioned. For example, if the equipment component 12 is a cementing head located at the surface, the controller 46 may be coupled directly thereto via a wired connection. The controller 46 may include, among other things, a user interface for communicating to an operator when maintenance on the equipment component 12 is needed according to the readings collected by the wear transducer 10.

In embodiments where the equipment component 12 is a tool, casing joint, valve, or other component to be positioned downhole, the controller 46 may be located proximate the equipment component 12 such that when the equipment component 12 having the wear transducer 10 is positioned downhole, the controller 46 is positioned downhole as well. In such instances, the controller 46 may be communicatively coupled (e.g., via a wired or wireless connection) to a surface level controller having a user interface to notify operators of when maintenance on the equipment component 12 is required. In other embodiments, the equipment component 12 that will be positioned downhole may be equipped with a communication interface (e.g., electrical or fiber optic lines, telemetry system, etc.) that communicates data detected by the wear transducer 10 directly to a surface level controller 46 in real time or near real time.

The controller 46 may include an information handling system that sends one or more control signals to the wear transducer 10 to control the ultrasonic signal output from the transmitting crystal. The controller 46 also retrieves data from the transducer 10 regarding the reflected signals collected by the receiving crystal. As used herein an information handling system may include any system containing a processor 48 and a memory device 50 coupled to the processor 48 containing a set of instructions that, when executed by the processor 48, cause the processor 48 to perform certain functions. The control/communication signals may take whatever form (e.g., electrical) is necessary to communicate with the associated wear transducer 10.

The controller 46 may continuously send a signal to the ultrasonic sensor 26 for the sensor 26 to output as an ultrasonic wave toward the end 18 of the metal coupon 24. The ultrasonic sensor 26 may return in real time (or near real time) the detected ultrasonic reflection signals that are picked up from the receiver portion of the sensor 26 to the controller 46. The controller 46, upon receiving these inputs from the ultrasonic sensor 26, may determine the current length 30 and volume of the extended end 18 of the metal coupon 24 that is exposed to erosive wear. The controller 46 may determine the length 30 of the end 18 of the metal coupon 24 based on the time it takes for the ultrasonic signals emitted by the sensor 26 to be reflected and received again at the sensor 26. The controller 46 may continuously send a signal, measure the remaining length 30 of the metal coupon and velocities from the returned ultrasonic signal, and iterate the information over time. The controller 46 may include a user interface for displaying the results of this iterative data collection process. From the reflected signals received via the wear transducer 10, the controller 46 may calculate a mass and volume of the end 18 of the coupon 24 which is still exposed to erosive wear.

The controller 46 may predict an amount of duty cycle left in the region of the equipment component 12 that is being monitored via the wear transducer 10. The controller 46 may continuously monitor the detected changes in length 30 of the metal coupon 24 and determine, based on the length 30 of the coupon 24, how much wear has occurred and how much time is left before the equipment component 12 should be taken out of use for maintenance on the worn part.

The wear transducer 10 measures the overall length and mass of the metal coupon 24. In some embodiments, as long as the coupon length and mass of a (total) are greater than the coupon length and mass of β (to inner wall 20), then there is still usable life in the equipment component 12.

A predetermined empirical relationship may be established between the multiphase fluid flow 16 and mass loss of the coupon 24 as a function of fluid velocity, fluid density, and time spent at multiphase flow. The controller 46 may use this predetermined function to determine a usable life in the equipment component 12 and to actively monitor usable wall thickness of the equipment component 12.

In instances where multiple wear transducers 10 are disposed at different positions throughout the same equipment component 12 (or the same system), the controller 46 may be communicatively coupled to each of the wear transducers 10. The controller 46 uses all the measured data received from the multiple wear transducers 10 to determine an estimated duty cycle of the equipment component 12 (or of the overall system). The controller 46 may notify an operator if an action is needed once any one of the multiple wear transducers 10 has reached the end of its acceptable wear or duty cycle based on the length 30 of its metal coupon.

Figure 3A:
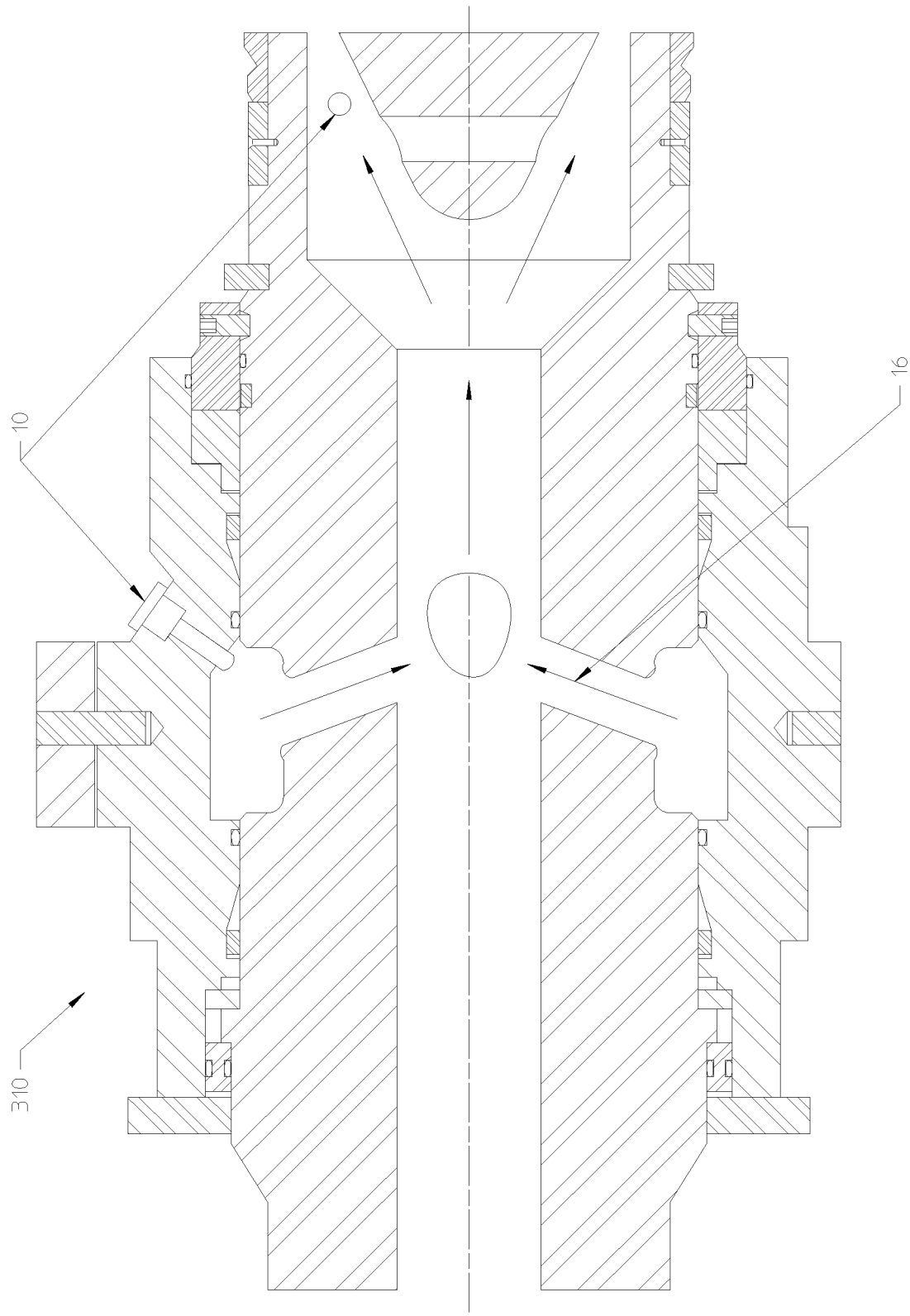
FIGS. 3A and 3B provide a schematic cross-sectional view of a cementing head assembly equipped with multiple wear transducers, in accordance with an embodiment of the present disclosure.
Figure 3B:
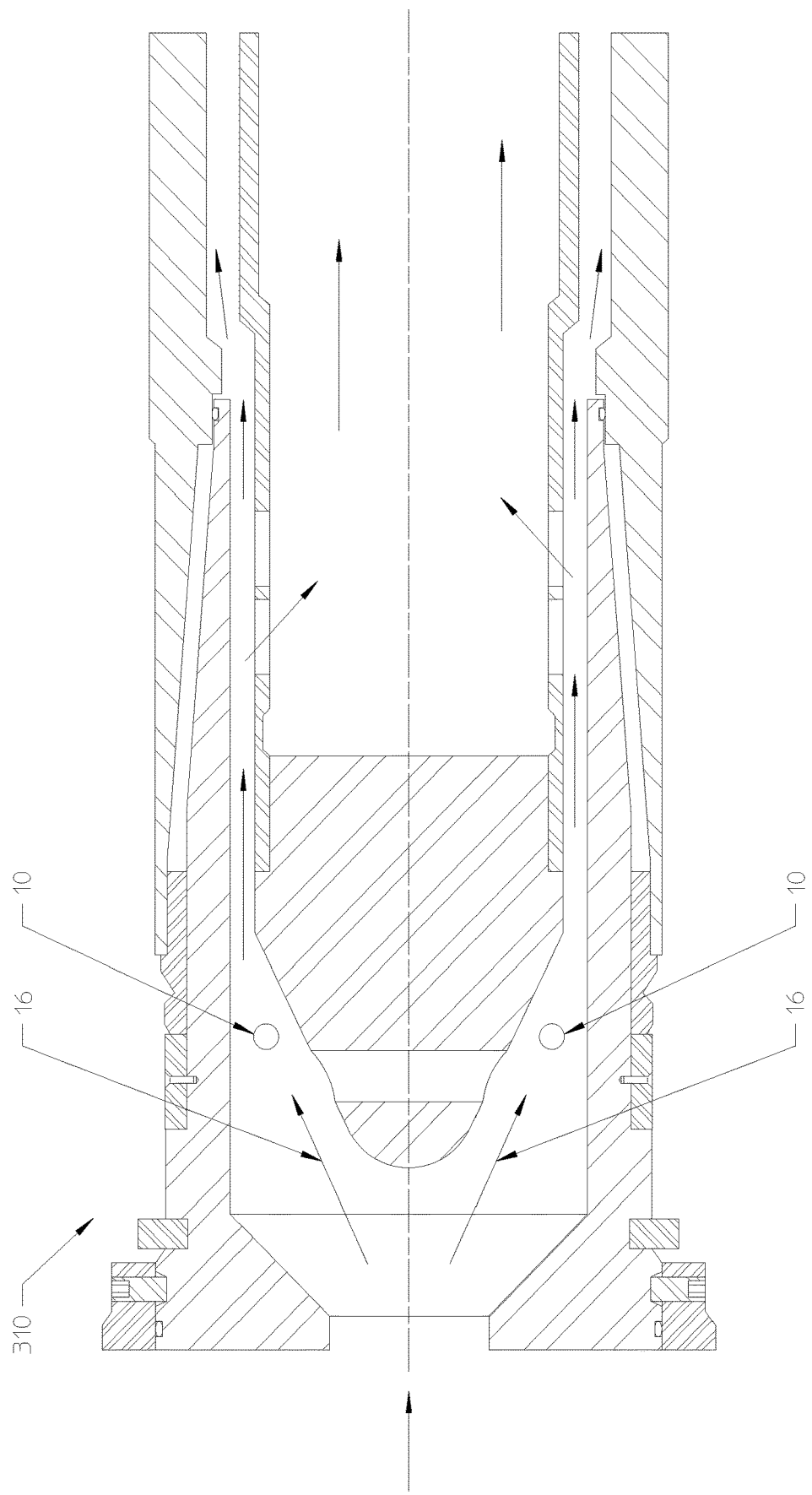

FIGS. 3A and 3B illustrate an example of an equipment component in which the disclosed wear transducer 10 may be mounted. The figures illustrate a cementing head 310 having multiple wear transducers 10 mounted therein. During cementing operations performed at the cementing head 310, various fluids may be pumped through the cementing head 310, and some of these fluids may be pumped at a high velocity so as to help move the cement through a casing string below the cementing head 310. As such, the fluid flow through certain parts of the cementing head 310 may be multiphase and/or turbulent, which can lead to wear on certain portions of the cementing head 310.

The arrows shown in FIGS. 3A and 3B represent the flow of fluids through the cementing head 310. The disclosed wear transducers 10 are disposed at locations of key geometries within the cementing head 310 that are most susceptible to wear from multiphase, turbulent fluid flow. The ultrasonic mass density transducers 10 are able to measure the remaining mass of the corresponding metal coupons (24 of FIG. 1) as they are eroded over time by the erosive flow 16 at key locations in the cementing head 310.

As mentioned above, all of the wear transducers 10 present in the cementing head 310 may be communicatively coupled to a single controller (46 of FIG. 1). Upon detecting that an extended end (18 of FIG. 1) of the metal coupon (24 of FIG. 1) of one or more of the wear transducers 10 has eroded by a predetermined amount, the controller may inform the operator that the cementing head 310 is due for maintenance.

By using signals retrieved in real time from wear transducers 10 to determine when to service the cementing head 310, operators are able to leave the cementing head 310 in operation for longer than would be possible if the operator merely followed guidelines for the equipment as established by empirical tests prior to the operation.

It should be noted that the disclosed wear transducer(s) 10 are not limited to use within a cementing head 310. Their placement within a cementing head 310 in FIGS. 3A and 3B is merely for illustrative purposes of one practical implementation of the transducers within a larger system of well equipment. The disclosed wear transducer(s) 10 may be used anywhere within an oil field system that is exposed to high velocity, multiphase, and/or turbulent fluid flow that can cause wear on metal parts. For example, one or more wear transducers 10 may be disposed at locations within a casing string, or at locations within downhole tools. The wear transducers 10 may be used to detect flow on a closed valve, such as a ball valve, to detect if the sealing surfaces have been cut by erosive flow.

Although the present disclosure and its advantages have been described in detail, it should be understood that various changes, substitutions and alterations can be made herein without departing from the spirit and scope of the disclosure as defined by the following claims.

What is claimed is:

1. A system, comprising:
    a well equipment component comprising a first portion that is exposed to an erosive fluid flow during operation of the well equipment component; and
    a wear transducer coupled to the well equipment component proximate the first portion, wherein the wear transducer comprises:
        a metal coupon including an elongated end that extends into a flowpath of the first portion of the well equipment component such that the elongated end is exposed to the erosive fluid flow;
        an ultrasonic sensor coupled to the metal coupon, wherein the ultrasonic sensor transmits ultrasonic signals through the metal coupon toward the elongated end and receives ultrasonic signal reflections back from the elongated end, wherein the ultrasonic sensor comprises:
            a transmitting crystal positioned to transmit ultrasonic signals through the metal coupon in a direction of the elongated end;
            a receiving crystal positioned to receive ultrasonic signal reflections back from the elongated end of the metal coupon; and
            a case housing the transmitting crystal and the receiving crystal; and
        a layer of acoustic gel disposed in a space between an end of the case and a surface of the metal coupon.

2. The system of claim 1, wherein the ultrasonic sensor is disposed within the metal coupon.

3. The system of claim 1, wherein the ultrasonic sensor further comprises an acoustic barrier located between the transmitting crystal and the receiving crystal.

4. The system of claim 1, wherein the ultrasonic sensor is disposed within a bore formed through the metal coupon, wherein a length of the bore is longer than a length of the case in an axial direction of the bore, wherein the space is located within the bore.

5. The system of claim 1, further comprising a controller communicatively coupled to the ultrasonic sensor of the wear transducer, wherein the controller is configured to estimate an amount of wear on the portion of the well equipment component based on data indicative of the reflected signals received at the ultrasonic sensor.

6. The system of claim 5, wherein the well equipment component comprises a second portion that is also exposed to an erosive fluid flow during operation of the well equipment component, the system further comprising:
    a second wear transducer coupled to the well equipment component proximate the second portion, wherein the second wear transducer comprises:
        a second metal coupon including an elongated end that extends into a flowpath of the second portion of the well equipment component; and
        a second ultrasonic sensor coupled to the second metal coupon;
    wherein the second ultrasonic sensor is communicatively coupled to the controller.

7. The system of claim 1, wherein the well equipment component is a cementing head.

8. The system of claim 1, wherein the wear transducer is mounted directly to the well equipment component via a connection mechanism.

9. A wear transducer device, comprising;
    a metal coupon configured to be coupled to a well equipment component, wherein the metal coupon comprises an elongated end configured to extend into a flowpath of the well equipment component and to be exposed to erosive fluid flow in the flowpath when the metal coupon is coupled to the well equipment component;
    an ultrasonic sensor coupled to the metal coupon, wherein the ultrasonic sensor comprises:
        a transmitting crystal positioned to transmit ultrasonic signals through the metal coupon in a direction of the elongated end;
        a receiving crystal positioned to receive ultrasonic signal reflections back from the elongated end of the metal coupon; and
        a case housing the transmitting crystal and the receiving crystal; and
    a layer of acoustic gel disposed in a space between an end of the case and a surface of the metal coupon.

10. The wear transducer device of claim 9, wherein the ultrasonic sensor further comprises an acoustic barrier located between the transmitting crystal and the receiving crystal.

11. The wear transducer device of claim 9, wherein the ultrasonic sensor is disposed within a bore formed through the metal coupon, wherein a length of the bore is longer than a length of the case in an axial direction of the bore, wherein the space is located within the bore.

12. The wear transducer device of claim 9, wherein the wear transducer device is communicatively coupled to a controller configured to estimate an amount of wear on the well equipment component based on data indicative of the reflected signals received at the ultrasonic sensor.

13. A method, comprising:
coupling a wear transducer to a well equipment component, wherein the wear transducer comprises:
a metal coupon including an elongated end;
an ultrasonic sensor coupled to the metal coupon, wherein the ultrasonic sensor comprises a transmitting crystal, a receiving crystal, and a case housing both the transmitting crystal and the receiving crystal; and
a layer of acoustic gel disposed in a space between an end of the case and a surface of the metal coupon,
wherein the elongated end of the wear transducer is extending into a flowpath of the well equipment component when the wear transducer is coupled to the well equipment component;
exposing the elongated end of the metal coupon to an erosive fluid flow through the flowpath;
transmitting ultrasonic signals through the metal coupon toward the elongated end and receiving ultrasonic signal reflections back from the elongated end via the ultrasonic sensor; and
estimating based on the ultrasonic signal reflections received at the ultrasonic sensor an amount of wear on a portion of the well equipment component proximate the wear transducer.

14. The method of claim 13, wherein the transmitting ultrasonic signals, receiving ultrasonic signal reflections back from the elongated end, and estimating the amount of wear on the portion of the well equipment component occurs during operation of the well equipment component.

15. The method of claim 13, wherein the erosive fluid flow through the flowpath is a turbulent, multiphase flow of fluid.

16. The method of claim 13, wherein estimating the amount of wear on the portion of the well equipment component comprises:
measuring a time between transmitting an ultrasonic signal through the metal coupon toward the elongated end and receiving a reflection of the ultrasonic signal back from the elongated end;
detecting, based at least in part on the measured time, a current length of the metal coupon;
comparing the current length of the metal coupon to a predetermined original length of the metal coupon; and
estimating the amount of wear on the portion of the well equipment component based on a change in length of the metal coupon.

17. The method of claim 13, further comprising predicting an amount of duty cycle left for the well equipment component to operate based on the estimated amount of wear.

* * * * *